United States Patent [19]

Spaulding et al.

[11] Patent Number: 5,586,203
[45] Date of Patent: Dec. 17, 1996

[54] METHOD AND APPARATUS FOR GENERATING A HALFTONE PATTERN FOR A MULTI-LEVEL OUTPUT DEVICE

[75] Inventors: Kevin E. Spaulding, Spencerport; Lawrence A. Ray, Rochester, both of N.Y.

[73] Assignee: Eastman Kodak Company, Rochester, N.Y.

[21] Appl. No.: 331,246

[22] Filed: Oct. 28, 1994

Related U.S. Application Data

[63] Continuation of Ser. No. 131,801, Oct. 4, 1993, abandoned.

[51] Int. Cl.[6] ........................................ G06K 9/38
[52] U.S. Cl. ............................ 382/270; 358/457
[58] Field of Search ............................ 382/270, 271, 382/273; 358/465, 457, 458

[56] References Cited

U.S. PATENT DOCUMENTS

| | | | |
|---|---|---|---|
| 3,681,650 | 1/1972 | Koll | 315/30 |
| 4,920,501 | 4/1990 | Sullivan et al. | 382/52 |
| 5,051,844 | 9/1991 | Sullivan | 358/456 |
| 5,111,310 | 5/1992 | Parker et al. | 358/457 |
| 5,214,517 | 5/1993 | Sullivan et al. | 358/456 |
| 5,239,597 | 8/1993 | Chung et al. | 358/457 |

FOREIGN PATENT DOCUMENTS

| | | | |
|---|---|---|---|
| 0560285A1 | 3/1993 | European Pat. Off. | H04N 1/40 |
| 0547382 | 6/1993 | European Pat. Off. | H04N 1/40 |
| 2007849 | 1/1970 | France . | |

OTHER PUBLICATIONS

H. Kotera, K. Yoshida, Y. Tsuda, H. Horiuchi, N. Takehara and H. Odaware, "A Poster–Size Color Ink–Jet Printing System", Proceedings of the Society for Information Display (SID), vol. 25/4, 1984.

*Primary Examiner*—Joseph Mancuso
*Assistant Examiner*—Gerard Del Rosso
*Attorney, Agent, or Firm*—Thomas H. Close

[57] ABSTRACT

Method and apparatus for generating a halftone image for a multi-level output device employing a dither matrix generated by minimizing a visual cost function. The dither matrix is addressed by the least significant bits of a pixel address and the value supplied by the dither matrix is added to the pixel value. The resulting sum is quantized in a quantizer to produce the multi-level halftone value.

16 Claims, 4 Drawing Sheets

METHOD AND APPARATUS FOR GENERATING A HALFTONE PATTERN FOR A MULTI-LEVEL OUTPUT DEVICE

This is a continuation of application Ser. No. 08/131,801, filed Oct. 4, 1993 now abandoned.

CROSS REFERENCE TO RELATED APPLICATIONS

Reference is made to commonly assigned U.S. patent application Ser. No. 07/848,779, filed Mar. 10, 1992, entitled "Method and Apparatus for Generating Simultaneously Derived Correlated Digital Halftone Patterns" in the name of Lawrence A. Ray.

1. Field of the Invention

The present invention relates to the field of digital image processing and more particularly to a method for halftoning digital images for a multi-level output device.

2. Background of the Invention

Halftoning is a technique which is commonly used in digital imaging to create the appearance of intermediate tones or color values when only a limited number of specific tones or color values are available (e.g. two tones for a binary black and white output device or several tones in each of several colors for a multi-level color output device such as a color thermal printer or color CRT). Halftoning methods rely on the fact that an observer's eye will spatially average over some local area of the image so that intermediate tone levels and/or color values can be created by turning some of the pixels "on" and some of the pixels "off" in some small region. The fraction of the pixels which are turned on (and the level that they are turned on in a multi-level output device) will determine the apparent gray level in the small region. Examples of common halftoning techniques include dithering and error-diffusion.

As noted by Gentile et al in the article entitled "Quantization and multilevel halftoning of color images for near-original image quality"; Vol. 7, No. 6/June 1990/J. Opt. Soc. Am. A page 1021, the process of dithering may be implemented by adding a dither signal to each color component of a digital image signal before quantization. The dither signal is spatially periodic and uniformly distributed over the range $+\Delta/2$ to $-\Delta/2$, where $\Delta$ is the spacing between output levels in the quantizer. Gentile et. al. employed a 4×4 pattern which was shown by Bayer to be optimal for a specified criteria. Experience has shown that the Bayer pattern produces noticeable artifacts in halftoned images. In U.S. Pat. No. 5,111,310 issued May 5, 1992 to Parker et al. multilevel halftoning is expressed mathematically as follows:

$$h_k(i,j) = \frac{1}{2^k - 1} \text{int}\{(2^k - 1)m(i,j) + f(i,j)\} \quad (1)$$

where:

$f(i,j)$ is the continuous tone input image;

$m(i,j)$ is the matrix of threshold values;

$h_k(i,j)$ is the $k^{th}$ level of the output image;

"int" denotes integer truncation; and the gray levels of $m(i,j)$ and $f(i,j)$ vary between 0 and 1 (here the range of the continuous tone image has been normalized to one).

Parker et al obtain a matrix of threshold values by using an iterative Fourier Transform Technique where a blue noise mask is applied to the Fourier Transform of the halftone dot profile upon each iteration. The dither matrix generated by Parker et al. contains 128×128 values, which requires a very large memory. For smaller dither matrices, e.g. 16×16, the Fourier transform process employed by Parker does not readily converge to a nearly optimum solution. Furthermore, the generally defined blue noise spectrum used by Parker et al. is not necessarily optimized for the human visual system. The model of the blue noise spectrum given by Parker et al. is only a rough approximation of the human visual response. The human visual response for example is not radially symmetric (it falls off at 45 degrees), whereas Parker et al. use a radially symmetric model. Nor does the method of Parker et al. normalize the spectrum to take into account viewing distance or dot pitch, thereby resulting in a dither matrix that is not optimized for given viewing conditions..

SUMMARY OF THE INVENTION

It is the object of the present invention to provide a multilevel halftoning method and apparatus that overcomes the problems noted above with respect to the prior art. The object is achieved according to one aspect of the present invention by providing a dither matrix of values ranging between $\pm\Delta/2$, where $\Delta$ is the spacing expressed in input signal levels between output levels in a quantizer, the dither matrix values being obtained by minimizing a visual cost function. In the halftoning method and apparatus according to the present invention, the dither matrix values are modularly addressed and added to the pixel values of the digital image. The resulting sum is quantized in a K-level (m-bit) quantizer where the quantizer output levels are separated by $\Delta$ input signal levels. In a preferred embodiment, the cost function is defined as follows:

$$C_t = \sum_{i=0}^{M_x-1} \sum_{j=0}^{M_y-1} V_{ij}^2 R_{t,ij}^2, \quad (2)$$

where, $C_t$ is the cost for a single threshold value;

$M_x$ and $M_y$ are the dimensions of the dither matrix;

$R_t,ij$ is the $(i,j)^{th}$ element of the discrete Fourier transform of the halftone pattern formed by thresholding the dither matrix at t; and $V_{ij}^2$ is the square of the value of the visual modulation transfer function for the frequency corresponding to element $(i,j)$.

According to an alternative embodiment, the dither matrix values range between $\pm\frac{1}{2}$ and the dither value is multiplied by a function of the pixel value prior to adding it to the pixel value, thereby providing a non-linear mapping between the pixel value and the K-level halftone value.

DETAILED DESCRIPTION OF THE INVENTION

Figure 1:
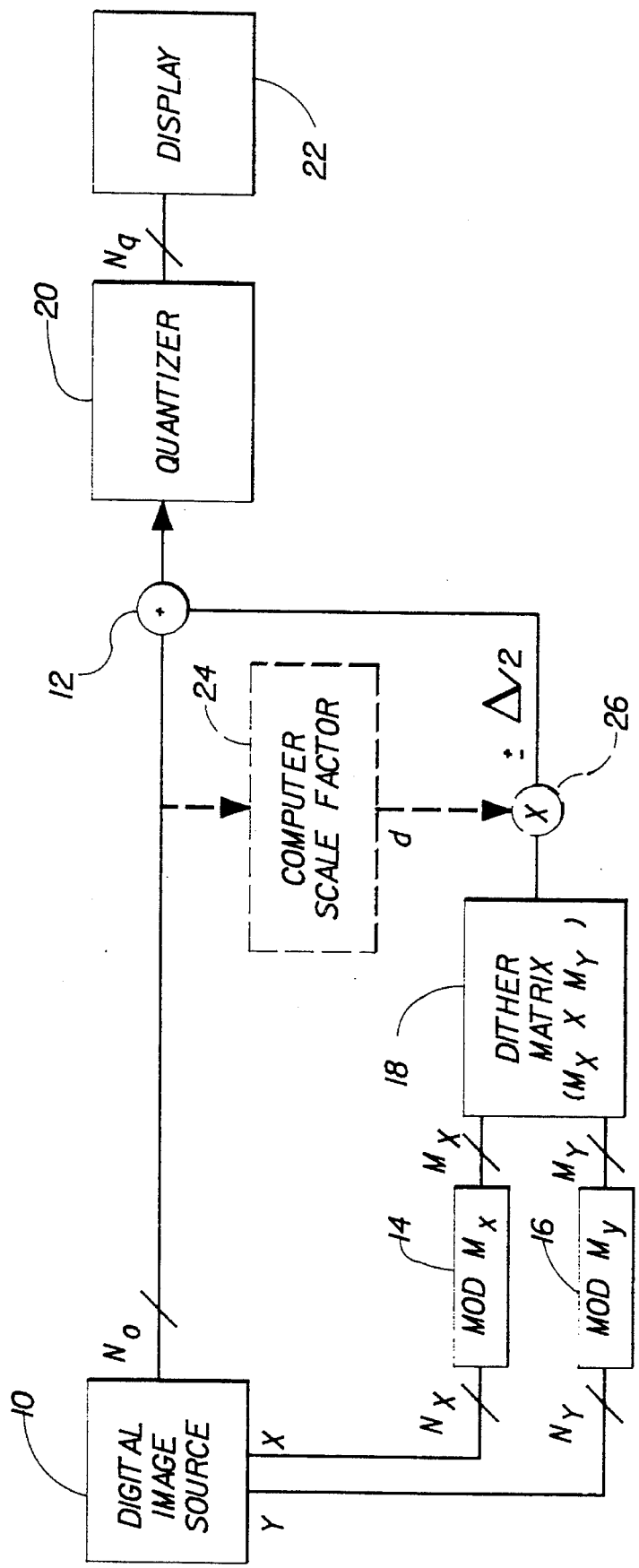
FIG. 1 is a schematic diagram of apparatus for performing multi-level halftoning according to the present invention.

Turning now to FIG. 1, a digital image processing system for halftoning an $N_o$ level digital image to drive an $N_q$ level display device, where No>Nq>1 is shown. The system includes a digital image source 10, such as a film scanner, digital electronic camera, computer graphics terminal, or digital memory device having a digital image stored therein. The digital image source 10 sequentially supplies $N_o$ level pixel values to an adder 12, and x,y addresses corresponding to the locations of the pixel values to modular arithmetic units 14,16. The modulus (i.e. the least significant bits) of the addresses $N_x$ and $N_y$ are taken in the units 14 and 16 to produce modular addresses $M_x$ and $M_y$ respectively.

Figure 2:
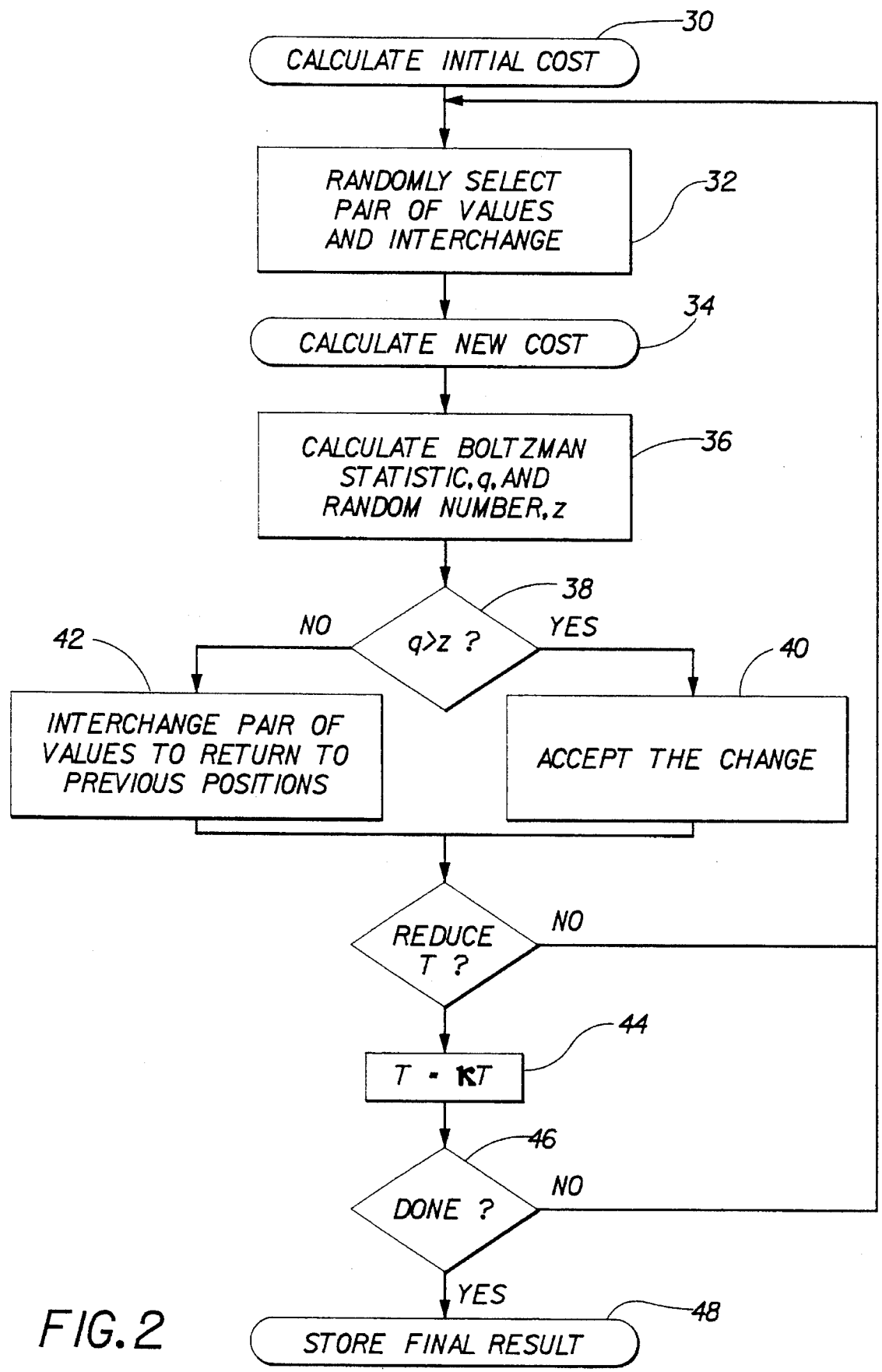
FIG. 2 is a flow chart showing the steps in the annealing process employed to generate a dither matrix according to the present invention.

The modular addresses $M_x$ and $M_y$ are supplied to an $M_x$ by $M_y$ dither matrix 18 that may be embodied for example in a read only memory (ROM). The dither matrix contains a matrix of values between $+\Delta/2$ to $-\Delta/2$ that are generated as described below with reference to FIG. 2. The dither matrix 18, in response to the address $M_x,M_y$ supplies a dither value to the adder 12, where the dither value is added to the digital image pixel value. The sum at the output of adder 12 is supplied to a quantizer 20 that produces an $N_q$ level output that is applied to a display device 22 such as a CRT or a printer. The $N_q$ levels are spaced apart by a distance of A levels of the input digital signal. Thus, for each input pixel value, the corresponding value from the dither matrix is added to the input value and the resulting quantity is supplied to the quantizer which determines the appropriate output level. The number of input levels which are mapped into each output level is given by $\Delta=N_o/N_q$. The values in the dither matrix are uniformly distributed between $\pm\Delta/2$. Up to this point, the description of FIG. 1 assumes that there is a linear relationship between the input levels and the output levels (i.e. an equal number of input levels are assigned to each output level.) With a small modification, this technique can also be applied to cases where there is a non-linear mapping between the input and output levels. In this case, the dither matrix contains values between $\pm\frac{1}{2}$. The dither value is then multiplied by a scale factor d (which is a function of the input level) before it is added to the input pixel value. The scale factor d is produced by a memory 24 (shown in phantom) and is supplied to a multiplier 26 (also shown in Phantom) in FIG. 1.

Another way to implement the dither for non-uniform quantization cells is to have separate dither matrices for each cell size, and a LUT which indicates which matrix should be addressed. This would eliminate some of the necessary calculations at the expense of increased memory usage.

The values in the dither matrix should be uniformly distributed between $-\Delta/2$ and $+\Delta/2$, where $\Delta$ is the number of input levels which are grouped into each output level. For the case where this grouping process is linear (i.e., all of the groups are the same size), the value of $\Delta$ will be $$\frac{N_O}{N_q},$$

where, $N_o$ is the number of digital tone values in the input image data, and $N_q$ is the number of digital tone values in the output image. For example, if the input image had 256 input levels and was being printed on a device with 16 output levels which are linearly related to the input levels, the value of $\Delta$ would be 256/16=16 and the dither matrix should contain values uniformly distributed between $-8$ and $+8$.

If the mapping between input and output levels is non-linear (so that the number of input levels mapped to each output level is not constant), then the value of $\Delta$ will be a function of the tone level. In this case, the distribution of the values in the dither matrix should be adjusted as a function of the tone level. One convenient method for doing this is the method shown in phantom shown in the embodiment shown in FIG. 1. With this configuration, a single dither matrix containing values distributed between $-\frac{1}{2}$ and $+\frac{1}{2}$ is used and a signal dependent scale factor d is then multiplied by the dither value before adding it to the input value.

To preserve the tonal fidelity of the image it is desirable to have a dither matrix with a total number of elements which is at least as large as $\Delta$ (so that all levels between $-\Delta/2$ and $+\Delta/2$ will be populated). Preferably, the number of elements should be some integer multiple of $\Delta$ so that the values in the matrix can be exactly uniformly distributed. If $\Delta$ is not constant (i.e., there is a non linear mapping from the input levels to the output levels) the number of elements should greater than or equal to the largest value of $\Delta$. If a smaller number of matrix elements are used, there can still be a significant gain in the image quality, but not all of the intermediate tone values will be reproduced.

The process of determining the optimum arrangement of the values within dither matrix consists of several steps. First, some initial guess at a dither matrix has to be made. Next, a "cost function" is defined which can be used to determine the relative quality of different arrangements of the dither matrix values. Finally, a combinatorial optimization procedure is used to determine the arrangement of the dither matrix values which minimizes the cost function.

The initialization of the dither matrix may be done by simply randomly loading the dither matrix array with uniformly distributed values between $\pm\Delta/2$. An example of such an initial array is shown in Table 1 below. For this example, $\Delta$ is 16 (corresponding to 256 input levels and 16 output levels), and an 8×8 dither matrix was used.

TABLE I

|       | -6 | 7  | -4 | 0 | 6  | -6 | 7  | -2 |
|-------|----|----|----|---|----|----|----|----|
|       | 1  | 0  | 5  | 5 | 8  | -2 | 2  | 3  |
|       | 5  | 6  | 3  | 6 | -6 | -5 | -5 | -1 |
| $M_x$ | 2  | -2 | -8 | 3 | 4  | 2  | 0  | 4  |
|       | 1  | -7 | -3 | 4 | -5 | -7 | -4 | 4  |
|       | 8  | 1  | -2 | 2 | -4 | -3 | 3  | -5 |
|       | 7  | -1 | -1 | 5 | -8 | -3 | -6 | 6  |
|       | 7  | -3 | 0  | 1 | -7 | -1 | -4 | -7 |
|       |    |    |    | $M_y$ |  |  |  |  |

Generation of the Cost Function

The generation of a cost function suitable for use with the present invention will now be described. An appropriate "cost function" is used to determine the relative quality of different arrangements of the dither matrix values. To form dither matrices which have minimum visual modulation, the cost function weights the power spectrum of the halftone patterns (generated by thresholding the dither matrix at some value) by the ability of the human observer to detect modulation at the various frequencies. In this way, matrices which produce strong frequency components that the eye can detect will have a high cost, and matrices which put most of the power at higher frequencies which are outside of the visual bandpass will have a lower cost.

A simple form for the cost of a dither matrix is:

$$C_t = \sum_{i=0}^{M_x-1} \sum_{j=0}^{M_y-1} V_{ij}^2 R_{t,ij}^2,$$

where, $C_t$ is the cost for a single threshold value;

$M_x$ and $M_y$ are the dimensions of the dither matrix;

$R_{t,ij}$ is the (i,j)$^{th}$ element of the discrete Fourier transform of the halftone pattern formed by thresholding the dither matrix at t; and $V_{ij}^2$ is the square of the of the value of the visual modulation transfer function for the frequency corresponding to element (i,j).

The goal of the digital halftoning scheme is to minimize the visual perception of modulation or noise in uniform areas. This requires a definition of visual modulation that is to first-order a functional model of the low-contrast photopic modulation transfer function (MTF) of the human visual system. The MTF can be approximated by the following equation:

$$V_{ij} = \begin{cases} a(b + c\bar{f}_{ij})\exp(-(c\bar{f}_{ij})^2), & \text{if } \bar{f} > f_{max}, \\ 1.0, & \text{otherwise}, \end{cases} \quad (3)$$

where the constants a,b,c, and d are calculated from empirical data to be 2.2, 0.192, 0.114, and 1.1 respectively; $f_{ij}$ is the radial spatial frequency in cycles/degree of visual substance scaled for the viewing distance and $f_{max}$ is the frequency at which the weighted exponential peaks. To implement this, it is necessary to convert discrete horizontal and vertical document frequencies, $\{f_i, f_j\}$ into radial visual frequencies.

For a symmetric printing grid, the horizontal and vertical discrete frequencies are periodic and given in terms of the dot pitch $\delta$ and the number of frequencies N by:

$$f_i = \frac{i-1}{\delta N} \quad (4)$$

$$f_j = \frac{j-1}{\delta N}.$$

Converting these to radial frequencies, and scaling the result to cycles/visual degree for a viewing distance, dis, in millimeters gives:

$$f_{ij} = \frac{\pi}{180 \arcsin\left(\frac{1}{\sqrt{1+dis^2}}\right)} \sqrt{f_i^2 + f_j^2} \; ; \quad (5)$$

$$i,j = 1,2,3, \ldots, N.)$$

Finally, to account for variations in visual MTF as a function of viewing angle, $\theta$, these frequencies are normalized by an angular-dependent function, $s(\theta_{ij})$, such that:

$$\tilde{f}_{ij} = \frac{f_{ij}}{s(\theta_{ij})} \quad (6)$$

where $s(\theta ij)$ is defined as:

$$s(\theta_{ij}) = \frac{1-w}{2} \cos(4\theta_{ij}) + \frac{1+w}{2} \quad (7)$$

with w being a symmetry parameter, and $$\theta_{ij} = \arctan\left(\frac{f_j}{f_i}\right). \quad (8)$$

Equation (2) gives the cost for a single threshold value. The cost for the given realization of the dither matrix must take into account all of the possible threshold values. This can be done using a process as follows:

$$C = \left( \sum_{t=-\Delta/2}^{\Delta/2} (C_t)^p \right)^{\frac{1}{p}} \quad (9)$$

where p is typically taken to be 1 or 2. Larger values of p have the effect of weighting larger costs more strongly.

Several variations may be used for the form of the cost function. One form which we have found to work quite well is to normalize the costs at each threshold by the average cost calculated for a series of random variations of the matrix elements, $<C_{to}>$:

$$C = \left( \sum_{t=-\Delta/2}^{\Delta/2} \left( \frac{C_t}{<C_{t0}>} \right)^p \right)^{1/p} \quad (10)$$

where $<>$ denotes the average. This insures that each of the threshold levels is treated more equally in the optimization process. Another cost function which may be used is to calculate the variance of the weighted costs at each threshold value rather than summing them as in Eq. (9). This has the effect of suppressing strong spikes in the perceived power spectrum. Another possible cost function takes into account the variance between the weighted spectrums for the different tone levels. This approach minimizes changes in the texture as a function of tone level.

Generation of the Dither Matrix by Stochastic Annealing

Figure 3:
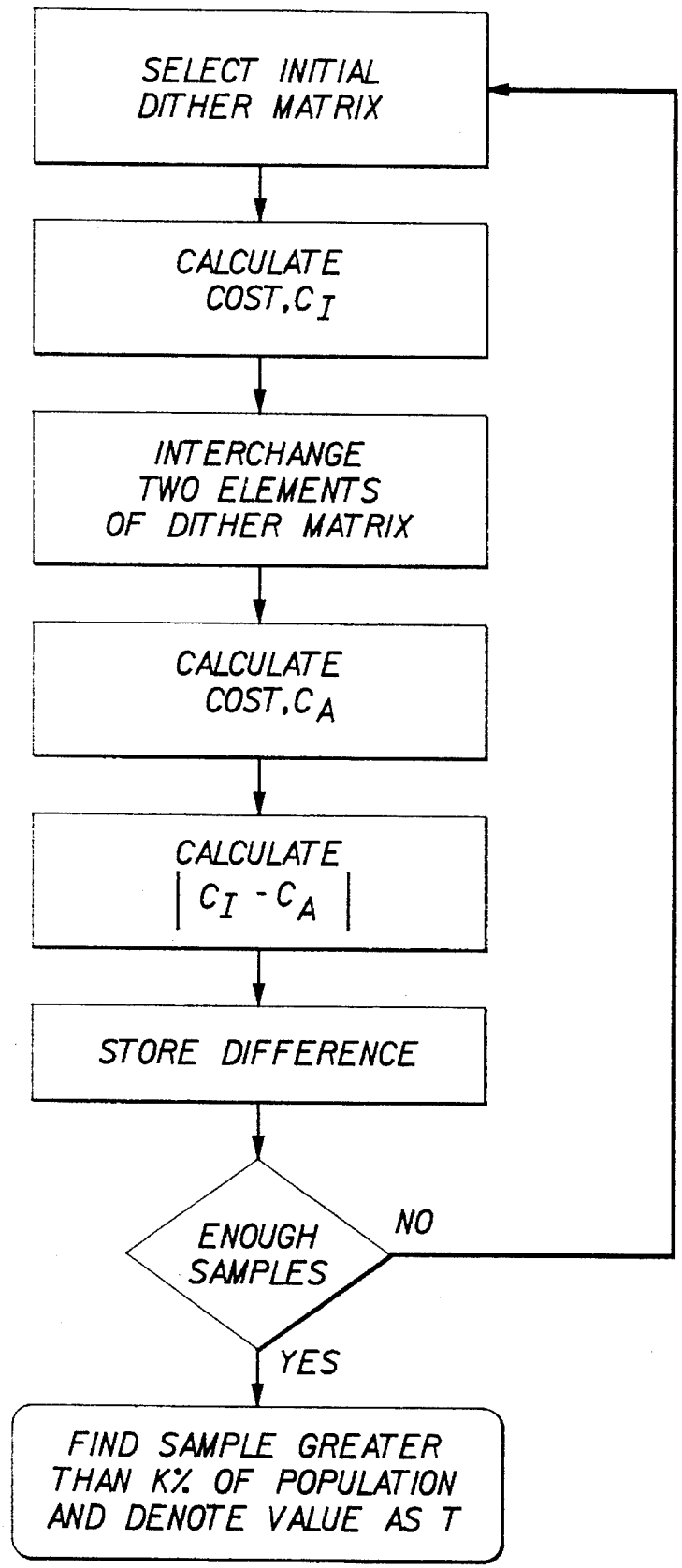
FIG. 3 is a flow chart showing the steps in selecting an intial value T in the annealing process.

Once the cost function has been defined it is then necessary to find an arrangement of the values within the dither matrix which gives the smallest possible cost. The number of possible different arrangements of the values within the matrix is so large that, in general, it is not practical to calculate the cost for all of the variations to find the one which gives the overall smallest cost. There are a variety of optimization techniques which can be used to minimize the cost function. One method that we have used quite successfully is known as stochastic annealing. Implementation of the stochastic annealing process will now be explained with reference to FIG. 2, and involves the following steps:

1. Calculate an initial cost temporarily known as the "old cost", (30) for the initial dither matrix like the example shown in Table 1 using the cost function of equation 10;
2. Randomly select a pair of matrix values and interchange them in the matrix to form a new dither matrix (32);
3. Calculate a new cost (34) for the new dither matrix using the cost function of equation 10;
4. Calculate a Boltzman test statistic q and a random floating point number z between 0 and 1 (36) to determine if the new dither matrix is acceptable, where q is given by:

$$q = \exp\left(-\frac{\Delta \text{Cost}}{T}\right)$$

where $\Delta$Cest=new Cost-old Cost, and the parameter T is set initially such that a large percentage, e.g. 80%, of new dither matrices will be accepted in the following step, even if $\Delta$Cest>0. Referring to FIG. 3, the parameter T is selected as follows:

i) Select an initial dither table like that in Table 1
  ii) Calculate the cost of this dither table and refer to the cost as initial cost
  iii) Randomly select a pair of dither matrix values and interchange them to form a new dither matrix
  iv) Calculate the cost for the new dither matrix and refer to the cost as altered cost
  v) Calculate the absolute value of the difference of initial cost and altered cost
  vi) Save the difference in a table
  vii) Repeat steps i. –vi. a sufficient number of times to have a statistically meaningful population, e.g. 1,000 samples
  viii) Select T such that T is larger than a large percentage of the table entries, e.g., 80%

5. If q>z (38), keep the new dither matrix (40) and refer to the cost calculated in step 3 as the "old cost". If q≤z, return the dither matrix to its previous state (42);
6. After many iterations of steps 2–5 above, e.g., 1500, reduce the parameter T to κT (44), where 78 <1, e.g., κ=0.95;

7. When T is sufficiently small so that the costs at successive value of T are no longer changing, or after a fixed number of parameter T changes have been made, e.g. 200, the process is done (46) and the final dither matrix is stored in a memory (48).

This process requires large computational resources and may be performed for example on a MIMD parallel processor with 64 nodes such as the AT&T Pixel™ Machine, or a Cray XMP computer.

An example of an optimized dither matrix is shown in Table 2 below. This matrix was calculated using stochastic annealing starting from the random matrix shown in Table 1. The cost function in this case was that given in Eq. (10). A viewing distance of 30" and a pixel frequency of 300 dpi was assumed in the calculation of the visual modulation transfer function. The normalization values, $(C_{to})$, were determined by calculating the average costs for 1000 random arrangements of the dither matrix values. A value of p=2 was assumed for the cost summation.

TABLE 2

|       |    |    |    |    |    |    |    |    |
|-------|----|----|----|----|----|----|----|----|
|       | -8 |  5 | -3 |  4 |  3 |  7 | -3 |  1 |
|       | -2 |  7 |  0 | -5 | -7 | -4 |  4 |  2 |
|       | -6 |  3 | -6 |  8 |  1 | -5 |  0 |  6 |
| $M_x$ |  5 | -4 | -6 |  6 | -1 |  2 | -7 | -3 |
|       |  0 |  1 | -2 |  4 | -8 |  5 |  3 |  7 |
|       | -7 | -5 |  3 |  7 | -3 | -1 | -4 | -2 |
|       |  4 |  2 | -4 |  2 | -1 |  6 |  1 |  8 |
|       | -1 |  6 | -7 |  0 | -2 |  5 | -6 | -5 |
|       |    |    |    | $M_y$ |    |    |    |    |

An image generated with the optimized dither matrix of Table 2 was generated and compared to an image generated with simple quantization (no dither), to an image generated using a random dither matrix, to a center grown dot pattern, and to an image generated with a Bayer dither matrix. It was observed that the image generated with the optimized dither matrix was superior to each of the other images. The image generated with no dither matrix in suffered from large quantization errors which manifested themselves as contours where many input tone levels are mapped to a single output tone. The images generated with the random dither matrix and the center grown dot matrix showed an improvement in the contour problem relative to no dither, but in both of these cases, halftone patterns were visible, and quite objectionable.

The dispersed dot Bayer matrix improved on the visibility of the halftone patterns relative to the random and center grown dots, but still produced textures which were generally more objectionable than the optimized dither matrix according to the present invention. The image generated with the visually optimal dither matrix had halftone patterns with much lower visibility, and was therefore preferable to the other dithered images.

Generation of the Dither Matrix using a Genetic Algorithm

Figure 4:
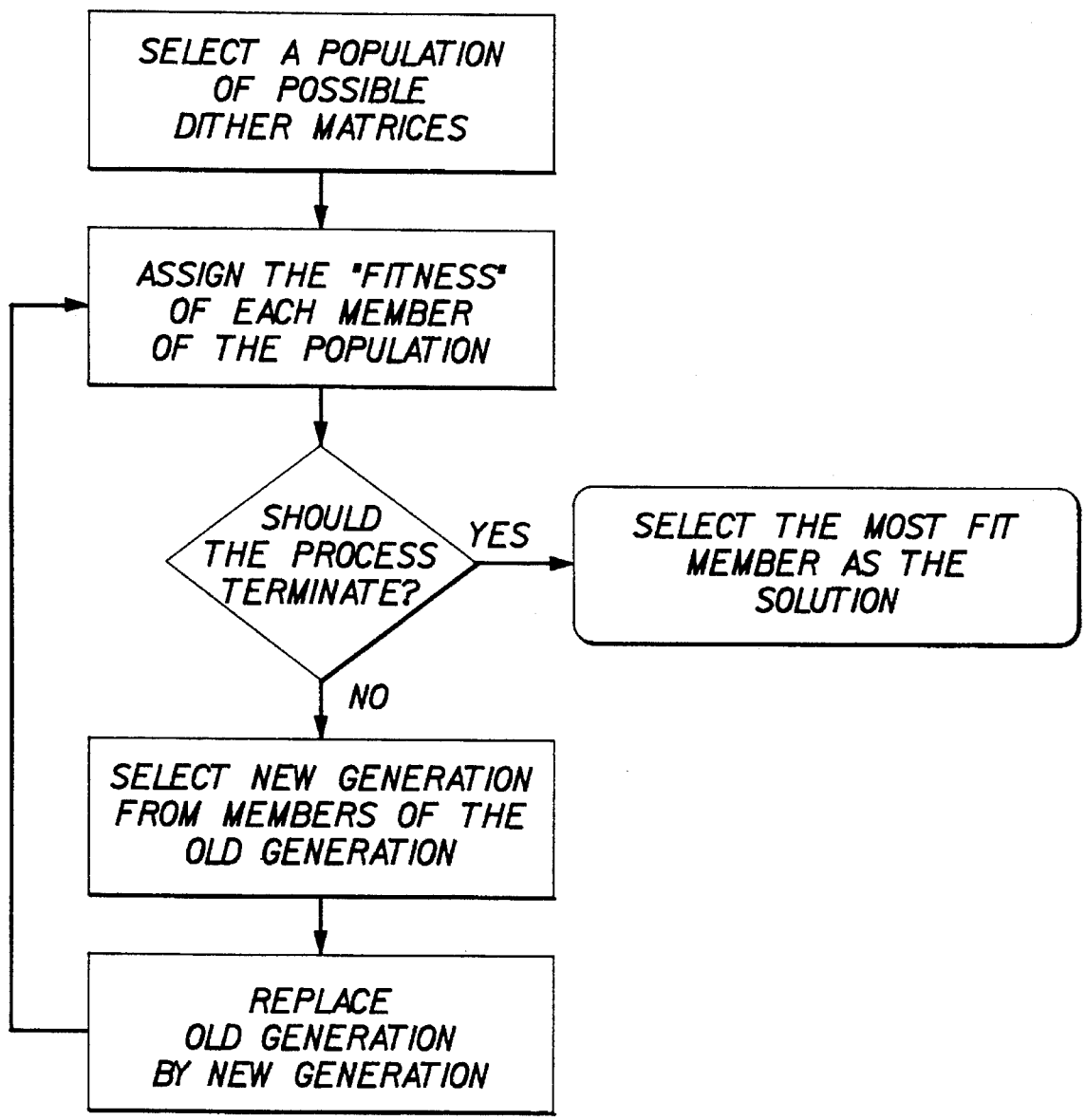
FIG. 4 is a flow chart showing the steps in a genetic algorithm process employed to generate a dither matrix according to the present invention.

Another combinatorial optimization algorithm is referred to as a genetic algorithm. This method uses a population of potential solutions and by an "evolution" process permits an optimal solution to emerge by "natural selection." For a generic description of these algorithms see David E. Goldberg, *Genetic Algorithms in Search, Optimization, and Machine Learning,* Addison-Wesley Publishing Company, Inc. 1989. In the following the Dither Table is represented as a linear string instead of the more common two-dimensional representation. The length of the string is denoted by S. A large number of variations to the following algorithm can be conceived, and it is understood that any simple variation is assumed in this disclosure. In general the search space for the genetic algorithm is the set of all permutations of the initial table (see Gregory J. E. Rawlings, *Foundations of Genetic Algorithms,* Morgan Kaufmann Publishers, 1991). A flow diagram of the algorithm is shown in FIG. 4 and the algorithm proceeds according to the following steps:

i) Initially, a population N of possible dither tables (strings) of lengths are selected randomly from the search space and their individual costs are computed for example, by equation (2) above. This is referred to as the Old Generation.

ii) Each member is assigned a "fitness" value according to their relative costs using a ranking algorithm such as:

$$\text{Rank} = \frac{\text{Cost}_i}{\sum_i \text{Cost}_i}$$

iii) Terminate process when a stopping criteria is met, e.g., the best fitness value is less than 1% better than the population average.

iv) Select a New Generation by the following substeps: steps:

a) Some portion (say M <N) of the members of the Old Generation are included in the New Generation, where those selected have the best fitness as computed in Step ii).

b) Two members of the Old Generation are selected at random based upon their fitness with more fit members having a higher likelihood of being selected. One of the selected members is referred to as the donor and the other as the receiver.

c) A member of the New Generation, referred to as the offspring, is formed from the two members by the following procedure:

1) Choose position $0 \leq j < S$ and length $L, 2 \leq L < S-2$.

2) Extract a substring from the donor of length L; where if j+L>S then select the elements from the start of the string.

3) Copy the substring into the offspring starting at position j.

4) Complete the offspring's string as follows:
   add a successive element to the offspring from the receiver if the inclusion does not preclude the offspring from being within the search space; otherwise add the next element from the donor which assures the offspring to be within the search space.

d) Steps b) and c) are repeated a sufficient number of times in order for the New Generation to have N members.

iv) Rename the New Generation as the Old Generation v) Return to step ii).

This method can also be extended to color images by simply applying separate dither matrices to each of the color channels (i.e., RGB, CMY, etc.). It may be desirable to generate different realizations of the optimum dither matrix for each color channel (or at least to shift the optimum matrix to different starting coordinates for each color channel) so that the halftone patterns are as uncorrelated as possible.

We claim:

1. A method of halftoning a digital image in a digital image processing system, the digital image having an x,y array of pixel values each pixel having $N_o$ levels for output to a device having $N_q$ levels, where $N_o > N_q > 1$, comprising the steps of:

a. providing a memory containing a matrix of dither values generated by minimizing a visual cost function, wherein said visual cost function is a combination of costs for a plurality of threshold values;

b. modularly addressing said memory containing said dither matrix with the location of a pixel in said digital image to obtain an addressed dither value;

c. adding the addressed dither value to the value of said pixel to obtain a sum;

d. quantizing said sum to $N_q$ levels to produce a multi-level halftone image; and e. repeating steps b through d for every pixel in the digital image.

2. The method claimed in claim 1, wherein the cost for a single threshold value is defined as:

$$C_t = \sum_{i=0}^{M_x-1} \sum_{j=0}^{M_y-1} V_{ij}^2 R_{t,ij}^2,$$

where, $C_t$ is the cost for a single threshold value;

$M_x$ and $M_y$ are the dimensions of the dither matrix;

$R_{t,ij}$ is the $(i,j)^{th}$ element of the discrete Fourier transform of the halftone pattern formed by thresholding the dither matrix at t; and $V_{ij}^2$ is the square of the of the value of the visual modulation transfer function for the frequency corresponding to element $(_{ij})$;

t is an individual threshold value; and

P is a constant.

3. The method claimed in claim 1, wherein said visual cost function is minimized by stochastic annealing.

4. The method claimed in claim 1, wherein said visual cost function is minimized by a genetic algorithm.

5. The method claimed in claim 1, wherein said digital image is a color digital image having a plurality of color channels, and wherein a separate dither matrix is applied to each color channel.

6. The method claimed in claim 1, further comprising the step of multiplying the addressed dither value by a scale factor that is a function of the input pixel value before adding the addressed dither value to the input pixel value, to thereby provide a non-linear mapping between input n-bit pixel values and output halftone values.

7. Apparatus for halftoning a digital image having an x,y array of pixel valves, each pixel having $N_o$ levels for output to a device having $N_q$ levels, where $N_o > N_q > 1$, comprising:

a. a digital image source of pixel values and corresponding pixel addresses;

b. a memory containing a matrix of dither values generated by minimizing a visual cost function, wherein said visual cost function is a combination of costs for a plurality of threshold values;

c. means for modularly addressing said memory with a pixel address to produce a dither value;

d. an adder connected to said digital image source to receive an input pixel value and connected to said memory to receive said dither value to produce a sum of said input pixel value and said dither value; and e. a quantizer having $N_q$ levels connected to said adder to receive said sum and producing an $N_q$ level halftoned digital image.

8. The apparatus claimed in claim 7, wherein the cost for a single threshold value is defined as follows:

$$C_t = \sum_{i=0}^{M_x-1} \sum_{j=0}^{M_y-1} V_{ij}^2 R_{t,ij}^2,$$

where, $C_t$ is the cost for a single threshold value;

$M_x$ and $M_y$ are the dimensions of the dither matrix;

$R_{t,ij}$ is the $(i,j)^{th}$ element of the discrete Fourier transform of the halftone pattern formed by thresholding the dither matrix at t; and $V_{ij}^2$ is the square of the of the value of the visual modulation transfer function for the frequency corresponding to element $(i_j)$;

t is and individual threshold value; and p is a constant.

9. The apparatus claimed in claim 7, wherein said visual cost function is minimized by stochastic annealing.

10. The apparatus claimed in claim 7, wherein said visual cost function is minimized by a genetic algorithm.

11. The apparatus claimed in claim 7, wherein said digital image is a color digital image having a plurality of color channels, and wherein said apparatus comprises a separate memory, addressing means, adder and quantizer for each channel.

12. The apparatus claimed in claim 7, further comprising means for multiplying the dither value by a function of the input pixel value prior to the adder, whereby a non-linear mapping is provided between the input pixel values and the output halftone values.

13. The method claimed in claim 2, wherein said visual cost function is defined as:

$$C = \left( \sum_{t=-\Delta/2}^{\Delta/2} \left( \frac{C_t}{<C_{t0}>} \right)^p \right)^{1/p}$$

where

Ct is the cost for a single threshold value;

$<C_{t0}>$ is the average cost for a series of random variations of dither matrix values thresholded at value t;

t is an individual threshold value; and p is a constant equal to or greater than 1.

14. The apparatus claimed in claim 8, wherein said visual cost function is defined as:

$$C = \left( \sum_{t=-\Delta/2}^{\Delta/2} \left( \frac{C_t}{<C_{t0}>} \right)^p \right)^{1/p}$$

where

Ct is the cost for a single threshold value;

$<C_{t0}>$ is the average cost for a series of random variations of dither matrix values thresholded at value t;

t is an individual threshold value; and p is a constant equal to or greater than 1.

15. The method claimed in claim 2, wherein said visual cost function is a variance of the costs $C_t$ for the threshold values.

16. The apparatus claimed in claim 8, wherein said visual cost function is a variance of the costs $C_t$ for the threshold values.

* * * * *